Nov. 13, 1934.   I. H. POLK   1,980,695
ART OF PRESERVING FRESH FRUIT JUICES IN THEIR NATURAL STATE
Filed Nov. 25, 1932   2 Sheets-Sheet 2
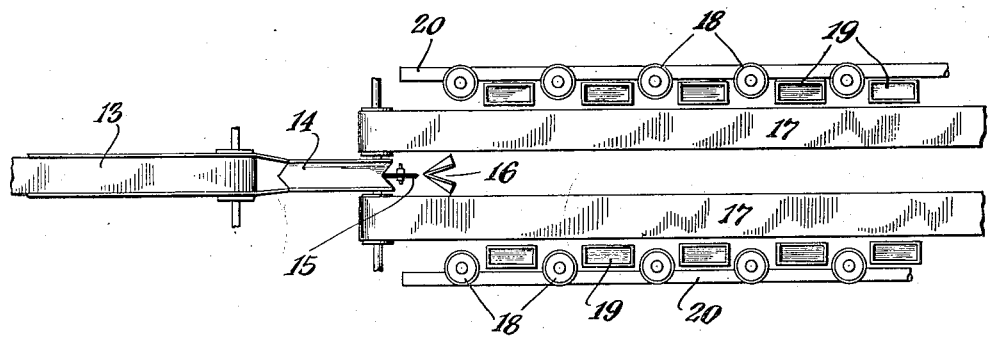
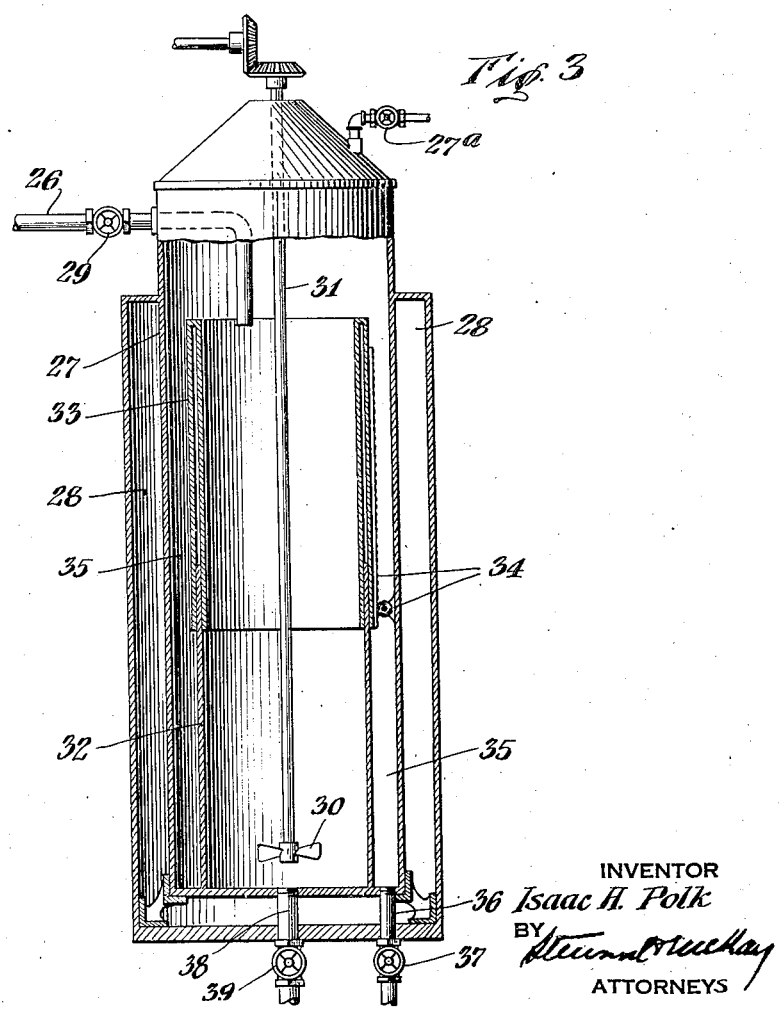
INVENTOR
Isaac H. Polk
BY
ATTORNEYS Patented Nov. 13, 1934

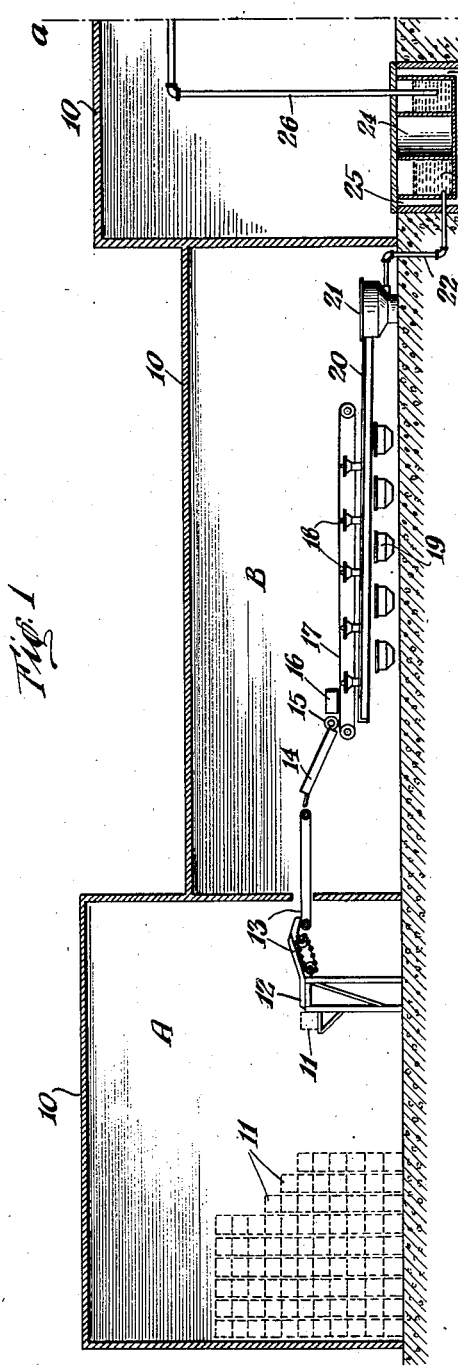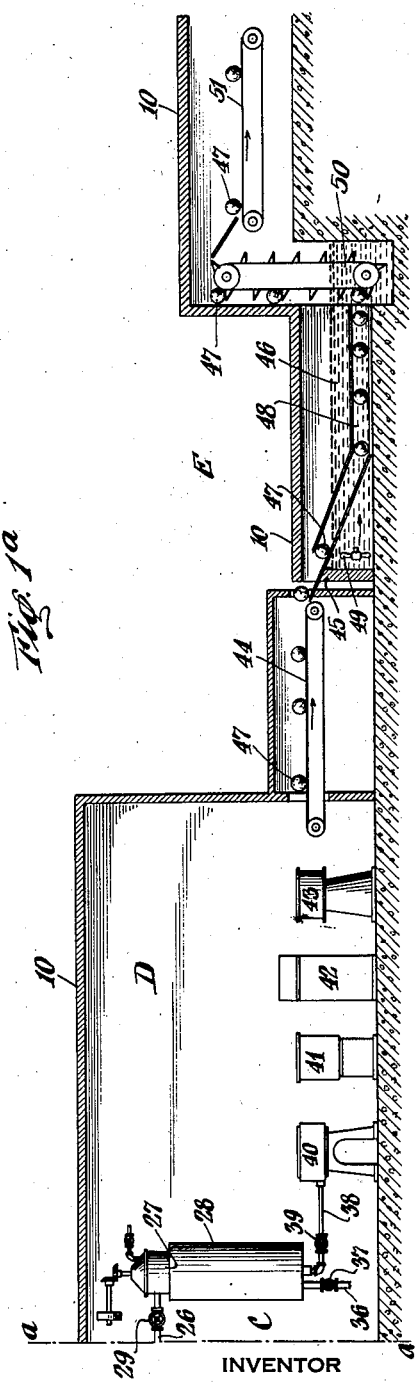

1,980,695

UNITED STATES PATENT OFFICE 1,980,695

ART OF PRESERVING FRESH FRUIT JUICES IN THEIR NATURAL STATE

Isaac H. Polk, Monrovia, Calif., assignor, by mesne assignments, to Sunset Packing Corporation, Los Angeles, Calif., a corporation of California Application November 25, 1932, Serial No. 644,360

22 Claims. (Cl. 99—11)

This invention relates to art of preserving fresh fruit juices in their natural state, and in particular it relates to extraction and treatment of orange juice and the like in such manner as to yield a juice product of good flavor and keeping qualities which has substantially the characteristics of fresh orange juice or which approaches that objective more closely than has been possible heretofore in the art.

While the invention is not to be understood as confined in its practical application to the preservation of the juice of oranges or other citrus fruit, the preservation of orange juice is at present the most important commercial field for the practice of the invention, and therefore this will be more particularly referred to hereinafter by way of concrete example embodying the underlying principles of the invention. It is to be borne in mind, however, that in its broader aspects the invention is applicable to the preservation of the juices of various other fruits in fresh, natural condition.

It is well known that numerous attempts have heretofore been made to pack fresh fruit juices, such as orange and other citrus juices, in such manner that they will keep for a substantial period of time and also retain the good palatability, fine flavor and other desirable characteristics possessed by the fresh juice immediately after its extraction from the fruit. Among these prior attempts may be mentioned pasteurization, treatment with light rays, extraction and packing in the presence of inert gases, and slow and quick freezing methods with and without agitation.

None of these proposed prior methods has made possible the commercial preparation of a juice product, in either liquid or frozen condition, that can be held for any substantial length of time and that retains the freshness and palatability characterizing freshly extracted juice. The quick-freezing methods have been found to be the most satisfactory from the standpoint of preserving the fresh taste of the juice; but in spite of prolonged and very expensive research and experimental work in an effort to render juice preservation by these methods commercially feasible, it has proved impossible until now to achieve the desired result even by quick-freezing methods.

Apparently the lack of success characterizing prior attempts to product a satisfactory fresh juice product of the type here under consideration has been due in large measure to the failure to provide a thoroughly systematic and methodical procedure by which the juice can be extracted and subjected to the necessary treatment in a minimum period of time and under operating conditions such that, at each step or stage of the procedure, a suitably low temperature is maintained and the chances of introducing air into the juice and thus causing oxidation are minimized. The present invention includes a procedure wherein these requirements are satisfactorily met, the several steps or stages being grouped together into a combination which is novel in the art and effective to yield a fresh juice product of markedly superior characteristics, this result being attained with an efficiency and economy such that the novel combined procedure is commercially feasible.

Another difficulty which has heretofore proved insuperable has been the practical impossibility of preventing contamination of the juice by essential oils and other constituents derived from the rind or peel without excessive removal or loss of pulp, and of removing such contaminants from the juice with sufficient completeness to avoid the damaging effect upon flavor and keeping quality they produce through the oxidation or other chemical change which they inevitably undergo. No practical way of avoiding this difficulty has been known to the art heretofore. The present invention, however, makes possible the removal of substantially all of the troublesome oily constituents and other important contaminants in a relatively simple and dependable manner, with the result that impairment of or deterioratiton in the juice flavor from this source is wholly or largely eliminated. This eliminates the chief obstacle heretofore blocking attempts to preserve orange juice and the like in fresh, natural state.

In brief general outline, the complete process of the present invention comprises, first, the step of extracting the juice from the fruit, most desirably after the fruit has been precooled to a temperature approximately the freezing point but not sufficiently low, under the conditions of operation, to effect actual freezing of the fruit. The juice is then strained to remove whatever relatively coarse pulp or other solids or semi-solids are contained therein, and may be allowed to stand for a short time to enable removal of such excess oils, pulp, and resins, as can be rapidly separated in a preliminary way by settling and skimming. This and the succeeding steps are also conducted at relatively low temperatures and under conditions such that introduction of air into the juice is minimized. After the preliminary separating step just mentioned, the juice is subjected, still at low temperature, to the action of a relatively high vacuum which should be on the order of at least 27 inches mercury vacuum gauge (3 inches mercury absolute pressure), and most desirably 28 inches or higher. In this step, the juice is agitated by one means or another but only to a limited extent, the purpose being merely to agitate sufficiently to ensure adequate exposure of all portions of the body of juice undergoing treatment to the applied high vacuum (low absolute pressure), whereby to effect as nearly complete de-aeration as is practically possible under the relatively low temperature and other operating conditions here involved. This application of high vacuum to the juice is not merely for the purpose of eliminating the contained air and its oxidizing effect but, as will appear presently, it also enables more complete elimination of oily and other contaminating impurities in the next succeeding stage of the process. After applying the high vacuum to the juice while it is being agitated for the limited period of time indicated, the juice is allowed to stand quietly for some time in a body of substantial depth while still subjected to the applied high vacuum. At this stage, a considerable quantity of solid and semi-solid material, including suspended pulp, cell membranes, and the like, especially that which is relatively coarse but has escaped separation up to this point, rises upwardly through all portions of the body of juice and collects after a relatively short period of time at the upper surface as a layer containing, in its upper portion which was the first to rise, all or substantially all the seriously objectionable contaminants, particularly oily and resinous matter, which still persist in the juice to some extent notwithstanding the previous preliminary settling and skimming operation already described as being most desirably effected in a preceding stage. This supernatant layer of solid and semi-solid pulpy or like material, or rather the upper portion of said layer, together with the accompanying contaminants which have thus been caught or entrained and virtually filtered out of the juice by the first portion especially of the solid particles of pulp etc. rising through the body of juice, is then rejected by decantation or otherwise, leaving a de-aerated and purified juice which is of greatly enhanced stability. It is also characterized by a ratio of solids to liquid which, in the practice of the process, is found to be quite definitely predeterminable and capable of being maintained substantially constant, a highly important advantage incapable of realization heretofore in practical work.

The juice is then placed in consumer-unit containers which are sealed under vacuum. Where the final product is to be in frozen form, the sealed containers are refrigerated in such manner as to effect freezing of their contents as quickly as possible under conditions minimizing physical separation of the dissolved and suspended solid constituents of the juice from the associated water content. After the freezing operation, the containers can be stored at subfreezing temperature until the juice is required for use, whereupon the frozen juice can be liquefied in any suitable manner.

The complete combination of process steps generally outlined above is believed to be novel in the art. Also certain of the steps so combined, which will be more fully hereinafter described, are believed to be individually novel.

In order to afford a fuller understanding of the principles underlying the invention, a desirable practical embodiment thereof as employed specifically in the preservation of orange juice in fresh natural condition will now be described in detail by way of a typical concrete example. While the process may be carried out in various forms of apparatus differing widely in specific detail, the description hereinafter given will include reference to an apparatus system which has been found to possess particularly desirable characteristics for the purposes in view and which also embodies novel features of importance. Such an apparatus system is illustrated more or less diagrammatically in the accompanying drawings wherein Figs. 1 and 1a, placed end to end on the line a—a, represent the system in side elevation, partly broken away and in section;

Fig. 2 is a plan of the extraction unit; and

Fig. 3 is a vertical central section, on a larger scale, of the vacuum separator unit.

Referring to the drawings, A represents generally a precooling unit wherein the oranges, prior to extraction of the juice, are cooled down to approximately the freezing point; while B represents generally the juice extraction unit, C the separating and de-aerating unit, D the container filling and sealing unit, and E the quick-freezing unit.

Since the entire series of operations comprising the complete process are carried out at temperatures either in the neighborhood of the freezing point or, in the case of the final freezing, much below the freezing point, the several units above mentioned are enclosed in rooms or chambers protected by suitable heat insulating material indicated generally at 10. The desired low temperatures are maintained in the several units of the system by appropriate refrigerating means of any well known or suitable type unnecessary to illustrate here.

The oranges to be handled in the plant are held in the precooler unit A, as in stacked boxes 11, until the fruit has been cooled to about 29° to 33° F., the optimum being about 30° F. No substantial freezing of the edible portion of the fruit will occur under these conditions even if the fruit remains in the precooler for several hours after attaining the stated temperature. This precooling of the fruit to within substantially the temperature range just mentioned is highly advantageous in its effect upon the keeping quality and other characteristics of the juice product finally obtained. Precooling the fruit before extracting the juice therefrom also favorably affects the subsequent vacuum separation of pulpy and fibrous matter carrying undesirable contaminants, already referred to, and indeed seems to be essential to the attainment of best results in effecting said vacuum separation. It is therefore an important specific feature of the invention in its best embodiments, although in its broader aspects the invention is not restricted to a combination of steps which necessarily includes precooling or, if precooling be employed to the use of that specific precooling temperature range. By precooling the fruit to within the stated temperature range of 29° to 33° F., say 30° F. as an average, the final juice product is superior in keeping quality and other respects to that obtained when a precooling temperature of, say, 35° F. is used, the process as a whole remaining otherwise the same. Prior work in this field gave no indication that pre-cooling the fruit to within this temperature range would result in such superiority in the final product.

After the fruit has been precooled to the desired precooling temperature, it is transferred from the precooling unit by way of box dump 12 and conveyor means 13 to the extraction unit B. It is delivered by the conveyor 13 to V-shaped trough 14 down which it rolls by gravity and by which it is presented to revolving knife 15, which halves the fruit, the halves being deflected by stationary deflecting or distributing device 16 to parallel conveyor belts 17. From these conveyor belts, operators take the halved fruit and subject it to the action of reaming machines 18 for extraction of the juice, the reamed fruit rinds being thrown into waste receivers 19. Any other suitable method may of course be used for extracting the juice, reaming being referred to here merely as illustrating one practical way of accomplishing the desired result. The installation here illustrated comprises a battery of ten reamers in two groups of five, each group being served by one of the belts 17. The reaming member of each machine is most desirably a cone-shaped rotating burr constructed in such manner as to reduce to a minimum the tearing effect upon fruit tissues, it being desirable to prevent as much as possible the introduction of oils and/or resins into the juice from the rind or peel and "rag". The reaming operation should be conducted in an environment cooled to 40° F. or lower in order to maintain the temperature of the juice as near the freezing point as is feasible.

Juice from each set or group of reamers passes into pipe 20 and flows by gravity into a strainer 21 where the seeds and relatively very coarse fragments of pulp and other solid material are separated from the juice. This strainer may be of any suitable type but most desirably it comprises screens of such size mesh and so agitated, vibrated or revolved as to allow passage therethrough of the juice, together with all the very fine pulp and a desirable proportion of moderately coarse pulp, while retaining and automatically moving to a place of discharge the seeds, very coarse pulp, etc. desirable to reject at this stage. The relative volumes of liquid, and solids and semi-solids, respectively, passing through the screen device can be definitely controlled by the size of the mesh as well as by the extent and rapidity of screen vibration, agitation or revolution. One important advantage of this type of strainer lies in the fact that by its use adequate separation therefrom of relatively very coarse solid material can be effected while subjecting the juice to only the minimum of agitation and consequent aeration.

From the strainer unit 21, the separated juice flows through pipe 22 into the bottom of an annular fore-cooler chamber 23 which should be suitably refrigerated to keep the juice at a temperature approximating the freezing point. In this instance the fore-cooler is shown as provided with central and peripheral spaces 24 and 25, respectively, for circulation of a refrigerant. The pipe 22 is shown discharging into the fore-cooler chamber at a point below the normal liquid level therein. This arrangement, and maintaining the pipe 22 full of juice at all times, are desirable measures of general application for minimizing introduction of air into the juice.

In the pre-cooler, the juice is allowed to stand a sufficient length of time to permit such portion of the light oils, gums or resins and pulp as will rise to the surface readily under these conditions to do so, these materials being removed in any convenient manner, as by skimming. One of the functions of this fore-cooler is to permit accumulation at this point of a substantial body of juice and thus to provide a source of supply from which a substantially constant-volume flow of juice into the next succeeding stage of the process can be smoothly and continuously effected, irrespective of more or less variation in the rate at which juice flows into the fore-cooler from the extraction unit B.

From the fore-cooler, the partially purified juice passes to the de-aerating unit. The de-aeration must be accomplished in a thorough and systematic manner but with a minimum amount of agitation of the juice. Excessive agitation, besides producing other undesirable results, promotes oxidizing reactions of various kinds and injuriously affects the flavor and keeping qualities of the juice. As already stated, the purpose of this de-aeration step is not merely to remove air from the juice. When carried out in accordance with the invention, this operation has the further purpose and effect of causing a substantial quantity of pulp, mostly of moderate or of intermediate coarseness, to ascend through the entire body of juice and to exert upon the entire body of juice a mechanical cleansing or filtering action, whereby even very small residual quantities of oily, resinous and other objectionable contaminants, practically impossible to remove by methods heretofore known, can be substantially eliminated in a simple and rapid manner. One of the chief reasons for the failures heretofore to obtain a natural orange juice product of good flavor and good keeping qualities has been the acknowledged inability to remove these last traces of oils, gums, etc. which undergo oxidation or other chemical change during the storage of the juice, thus inevitably causing its serious deterioration.

In effecting de-aeration in accordance with the present process, the juice, after settling and being skimmed, passes from the fore-cooler and settling container 23, through pipe 26, into a vacuum separator device 27 which is desirably of upright cylindrical form and provided with cooling jacket 28, whereby a body of juice of considerable depth may be maintained under high vacuum at a temperature approximating the freezing point. Means (not shown) are provided for maintaining in this vacuum separator a partial vacuum of at least 27 inches mercury vacuum gauge (3 inches absolute pressure), and most desirably of 28 inches vacuum gauge or higher. By virtue of the low pressure maintained in the vacuum separator, the juice to be de-aerated may be continuously drawn into the separator from container 23 through the aforesaid pipe 26 at a predetermined rate which can be adjusted as desired by control valve 29. Most desirably the rate of flow of juice into the separator is so regulated that the juice enters the pan in a relatively small stream, thus exposing the entire body of juice in successive small portions to the effect of the high vacuum as they enter the vacuum chamber and fall downwardly therein. During the filling of the vacuum separator chamber with the batch of juice to be de-aerated, the juice may optionally also be agitated cautiously by means of an agitator device comprising blades 30 carried by a suitably driven shaft 31. In contrast to de-aeration methods previously proposed, however, the present procedure is characterized by relatively very little agitation of the juice during the de-aeration treatment, since it is particularly desired to avoid disseminating throughout the juice the small residual quantity of oils, gums, etc., and the virtual emulsification thereof with the juice that necessarily accompanies the violent agitation heretofore characterizing de-aerating treatments.

After the desired amount of juice has been charged into the vacuum separator chamber through pipe 26, the inlet valve 29 is closed and the juice is slowly agitated by means of device 30 for a short time, a period on the order of two or three minutes being usually sufficient. This is primarily for the purpose of dislodging pulp particles adhering to the side walls and bottom of the separator chamber. The body of juice in the vacuum pan is then allowed to stand quietly for a substantially longer but limited period of time under the applied high vacuum. In a typical instance, this standing period may be on the order of 15 minutes. It is found that under these conditions a considerable amount of fairly coarse pulp and other suspended solid or semi-solid matter which, although carrying relatively large quantities of adsorbed air, would normally tend to sink to the bottom of the juice body, is caused by the action of the applied high vacuum to rise upwardly through the relatively deep body of juice and to accumulate in a layer at the upper surface thereof. Apparently the application of the high vacuum reduces the total effective pressure on the highly condensed adsorbed air carried by said solid or semi-solid matter, especially by the coarser particles thereof, permitting some expansion of such adsorbed air, with consequent buoyant effect upon the particles sufficient to overcome their normal tendency to sink, and to cause the described upward movement thereof through the quiescent column of juice. But whatever may be the correct explanation, such movement of the aforesaid particles does occur under the operating conditions here prescribed. Moreover, in its travel upwardly through the juice, this solid or semi-solid matter, more especially that which ascends during the earlier part of the standing period, collects and carries with it practically all of the residual oils, resins, gums and other troublesome contaminants which still persist in the juice and have heretofore defied even approximately complete removal. After the layer of pulpy material has accumulated at the upper surface of the juice column as described, the juice column should not be allowed to stand too long under the applied high vacuum before removing the upper part of said layer. Otherwise de-aeration of that portion of the solid or semi-solid matter carrying undesirable contaminants may proceed to the point where the particles composing such matter lose their buoyancy and sink downwardly, thus defeating to a greater or less extent the principal purpose of this vacuum separation treatment. At the conclusion of the period of standing or quiescence the layer of solids and semi-solids which has accumulated in the upper part of the juice column amounts in a typical instance to around twenty to twenty-five per cent of the total column height or depth. Since the aforesaid contaminants are found to be concentrated almost entirely in the upper portion of this layer, only such upper portion need be removed and discarded in any suitable manner in order to ensure substantial freedom of the remainder of the juice column from such contaminants. In practice, not more than the upper half or three-quarters of the said accumulated layer need be thus removed and discarded. The juice is maintained under the high vacuum until the removal or separation of the deleterious matter has been completed. This removal may be variously effected, but the decantation method hereinafter specifically described has important practical advantages. Also, the practice of this method is facilitated and simplified by the construction and arrangement of the novel vacuum de-aerating and separator unit here illustrated.

Within the shell of the vacuum separator is a juice container or receiver comprising a fixed lower portion 32, and a double-walled upper portion 33 which is in telescoping relation with the lower portion and can be moved upwardly or downwardly by means of a suitable rack and pinion device 34, for example, to vary the capacity of the juice receiver or container as a whole. At the start of the de-aerating and separating operation, the capacity of the receiver is adjusted to accommodate the entire volume or body of juice to be de-aerated at the time, the position of the parts being as shown in Fig. 3. The receiver is of slightly smaller diameter than the shell of the vacuum separator chamber 27, thus leaving an annular clearance between the shell and the receiver to provide an overflow space, as indicated at 35. The juice inlet pipe 26 is arranged to discharge into the receiver at a point just above the open top thereof when in its extended or full volume position.

Air having been previously exhausted from the vacuum separator as completely as possible, and juice sucked through pipe 26 from container 23 having been sprayed or sprinkled into the receiver until the latter is charged full, as already described, valve 29 is closed and, while the column of juice in the receiver is quiescent, the application of the high vacuum (e. g. 28 inches gauge or higher) continues until the desired action of the vacuum upon the juice is substantially complete and the before described layer of solid and semi-solid matter, with accompanying oily and other contaminants, has collected at the top. Thereupon, the upper portion 33 of the receiver is lowered by means of adjusting device 34 to the extent necessary to permit the predetermined upper portion of the accumulated semi-liquid supernatant mass or layer to overflow the upper edge of the juice receiver into the annular overflow chamber 35. This decantation having been effected, the juice remaining in the container 32—33, still under the applied high vacuum, is now agitated sufficiently to distribute therethrough the pulp constituting the residual lower portion of the layer originally accumulated. This residual pulp is a desirable constituent of the finished juice product and uniform distribution thereof through the juice at this stage, prior to the succeeding packaging operations, should be effected. This agitation of the purified juice following the described separation and rejection of that portion of the pulpy layer carrying the oily and resinous contaminants and while the juice is still under high vacuum, accomplishes even more nearly complete de-aeration of the juice and the residual relatively fine pulp particles left therein. This is desirable not only in and of itself but also because the buoyancy of said residual pulp particles is thereby reduced and uniformity of the distribution and suspension thereof throughout the juice is thus favored. After breaking the vacuum by cautiously opening valve 27ᵃ, the overflowed or decanted material may be subsequently withdrawn from chamber 35 through outlet pipe 36 by opening cut-off valve 37. The purified juice can be removed through outlet pipe 38 by opening cut-off valve 39. These cut-off valves normally remain closed at all other times.

Not only does the described vacuum separation eliminate oily and like contaminants to a degree of completeness impossible of attainment heretofore, but it also results in a more nearly perfect de-aeration of the juice. Complete removal of air from juice is extremely difficult, especially at the relatively low temperatures at which it must be handled in a process of this kind. A large part of the air content of extracted juice is tenaciously held in adsorbed condition by the coarser fragments and particles of pulp and other solids or semi-solids. Preliminary straining of the extracted juice removes some of the coarsest fragments; but the practical limitation of any straining method, and the further consideration that complete removal of pulp and the like is undesirable in any case, render it inevitable that in the strained juice there is still a substantial content of fairly coarse pulp carrying much adsorbed air. Application of high vacuum to strained juice while violently agitating it is insufficient because, aside from various objections to such agitation, it is ineffective to dislodge anything like all the adsorbed air which is chiefly held by such fairly coarse residual pulp. But in the present process, wherein a body of the strained juice of substantial depth is held quiescent under high vacuum, such coarser residual pulp fragments or particles have an opportunity to collect in the aforesaid supernatant layer of solids and semi-solids at or near the top of the juice column. Moreover, due apparently to the greater buoyant effect produced upon them by the applied vacuum, because of their larger content of adsorbed air as compared to relatively fine pulp particles, the coarser pulp particles are found mainly in the upper half of said supernatant layer and are thus removed and discarded, with their persisting air content, in the decantation step.

It will be noted also that, through the present process, it becomes a comparatively simple matter to adjust and control, with a high degree of exactness, the quantity and proportion of pulp to be left incorporated in the finished juice. Maintenance of a predeterminable or standard ratio of solids to liquid is a most important consideration in the marketing of orange juice, and inability to attain such uniformity of product has been one of numerous reasons why prior proposed methods have been unsatisfactory.

After the vacuum in the vacuum separator has been slowly released or broken in such manner as to avoid introducing air into the purified juice, valve 39 is opened and the juice is allowed to flow through pipe 38 to a filling machine 40 of any well known or suitable type whereby consumer packages or containers, such as glass bottles or properly enameled cans, may be filled in such manner as to exclude introduction of air into the juice. This is best accomplished by filling the containers from the bottom. It is to be understood that this operation is also conducted under appropriate refrigerating conditions. The filled containers then go to capping, closing and sealing machines of any well known or suitable type, indicated at 41, 42 and 43, respectively, the sealing being effected under the highest degree of vacuum practically attainable in the operation of such machines with the particular type of unit container employed.

Prior to filling the containers as just described, the containers are most desirably pre-cooled to the temperature of the juice, that is, to approximately the freezing point. This pre-cooling of the containers is of material importance for attainment of best results and is a highly desirable feature of the new process in its most advantageous practical embodiments.

Where, as is deemed most desirable, the juice is to be frozen into solid form, the sealed containers are then delivered by conveyor 44 to a quick-freezing unit, which in the present instance comprises an enclosed and suitably insulated tank 45 containing a freezing bath 46 of suitable liquid, such as alcohol, maintained at, say, 50 degrees below zero Fahrenheit ($-50°$ F.). The temperature of this freezing bath may be higher or lower than $-50°$ F. depending upon such practical considerations as size of the containers, the material of which they are made, and the like. But in any case the temperature should be low enough to bring about quick-freezing of the juice as this term is understood in the art.

The containers 47 roll by gravity down an inclined track 48, arranged to direct them through the freezing bath which may be maintained in circulation by a suitable propeller device 49 and kept at the desired low temperature by appropriate refrigerating means not shown and unnecessary to describe in detail. The length of the bath is such that by the time the containers have rolled through it, complete freezing of their contents has been accomplished. The rolling movement of the containers through the bath prevents nonuniformity in the frozen juice product which would otherwise result due to physical separation of suspended and dissolved solids from the water content of the juice which tends to occur during freezing, especially if the freezing is not very rapid. Under the described conditions of operation, however, a close approximation to instantaneous freezing can be had, because the juice is in fact super-cooled, that is, brought to a temperature substantially below its normal freezing point while it still remains liquid, to such an extent that a "flash-freeze" occurs, thus obtaining the benefits of the quick-freezing principle, including reduction of the aforesaid physical separation to a minimum, and maximum retention of volatile substances.

The track 48 delivers the containers, at a point below the level of the freezing bath, to an elevator device 50, which lifts them out of the bath and delivers them to conveyor belt 51, from which they may be taken by operators to be suitably packed for storage under refrigeration, most desirably at $0°$ to $10°$ F. When the juice is required for use, the unopened container may be placed in cold water or other environment, preferably at about $35°$ to $40°$ F., until the contents liquefy, the juice thus remaining under vacuum and protected against oxidizing influences throughout the thawing period and until ready to serve.

Throughout the entire process it is extremely important for attainment of best results that all operations be conducted under relatively low temperatures. In this way bacteriological action is reduced to a minimum, as well as aeration and consequent oxidation.

It will be understood that the various details of operation hereinabove given, such as temperatures, time periods, and the like, are susceptible of relatively wide variation within the scope of the invention, and that any specific figures mentioned are merely illustrative of good practice in typical instances.

What is claimed is:

1. In the art of preserving fruit juices in natural state, the process which comprises subjecting a body of freshly extracted fruit juice containing pulp particles, together with oily and other contaminants, to the action of a partial vacuum until a substantial quantity of the pulp has been caused to pass upwardly through said body of juice and form a supernatant layer containing such contaminants, removing at least the upper part of said layer, and packaging the residual juice.

2. The process defined in claim 1 which further includes conducting all the stated operations under refrigeration.

3. In the art of preserving fruit juices in natural state, the process which comprises subjecting a body of freshly extracted fruit juice containing pulp particles, together with oily and other contaminants, to the action of a partial vacuum until a substantial quantity of the pulp has been caused to pass upwardly through said body of juice and form a supernatant layer containing such contaminants, removing a predetermined upper portion of said layer, distributing the residual portion of said layer uniformly throughout the remaining body of juice, and packaging the juice.

4. The process defined in claim 3, which further includes conducting all the stated operations under refrigeration.

5. In the art of preserving fruit juices in natural state, the process which comprises cooling fresh fruit down to a temperature approximating the freezing point, extracting juice therefrom, agitating the extracted juice moderately while subjecting it to a partial vacuum of at least 27 inches mercury gauge, then further subjecting the juice in a quiescent state to such partial vacuum until a substantial quantity of pulp has passed upwardly through the body of juice and collected at the surface as a layer containing impurities, rejecting at least the upper part of said layer, filling the residual juice into containers, and sealing under vacuum, all the foregoing operations being effected at temperatures not exceeding 40° F.

6. The process defined in claim 5, which further includes quick-freezing the juice after it has been placed in the vacuum-sealed containers.

7. In the art of preserving orange juice in its natural state, the process which comprises removing juice from fresh oranges, preliminarily separating from the juice relatively coarse solid matter and associated contaminants of an oily and/or resinous nature, subjecting the separated juice to the action of a partial vacuum of such degree and for such length of time that solid matter therein is caused to rise therethrough and collect at the surface in a layer containing residual contaminants of the character aforesaid, separating at least the upper part of said layer from the juice and packaging the latter, all the foregoing operations being conducted under refrigeration.

8. In the art of preserving orange juice in its natural state, the process which comprises extracting juice from fresh oranges, preliminarily separating from the extracted juice relatively coarse solid matter and associated contaminants of an oily and/or resinous nature, subjecting the separated juice to the action of a partial vacuum of at least 27 inches vacuum gauge under conditions of agitation ensuring adequate exposure of all portions of the juice to the de-aerating action of the vacuum, then further subjecting the juice to the action of such partial vacuum without agitation until a substantial quantity of the pulp has been caused to pass upwardly through said body of juice and form a surface layer containing residual contaminants of the character aforesaid, separating at least the upper part of said layer from the juice and packaging the latter, all the foregoing operations being conducted under cooling conditions.

9. In the art of preserving fruit juice in its natural state, the process which comprises precooling fresh fruit to below 33° F., most desirably to about 30° F., while avoiding actually freezing the fruit, extracting juice from the precooled fruit, screening the extracted juice to remove therefrom relatively coarse solid matter, subjecting the screened juice to the action of an applied high vacuum, first while the juice is in motion and then while it is quiescent in a body of substantial depth, until a substantial quantity of the remaining pulp has been caused to pass upwardly through the quiescent body of juice and collect, together with contaminants such as oily and/or resinous matter, in a layer at the surface, removing at least the upper part of such collected layer, all the foregoing operations being conducted under refrigeration, and then quick-freezing the residual juice.

10. The process defined in claim 9, which further includes, prior to application of high vacuum to the screened juice, effecting a preliminary separation of a part of the oily and/or resinous matter by a standing and skimming treatment.

11. The process defined in claim 9, wherein, after removal of at least the upper part of said collected layer, the juice is filled into containers pre-cooled to a temperature at least as low as approximately that of the juice, the containers are sealed under vacuum, and the juice then undergoes quick-freezing.

12. The process defined in claim 9, wherein, after removal of at least the upper part of said collected layer, the juice is filled into round containers and sealed under vacuum, and said containers are caused to roll while being subjected to refrigerating conditions effective to accomplish quick-freezing.

13. In the art of preserving fruit juices in natural state, the process which comprises cooling fresh fruit down to a temperature approximating the freezing point, extracting juice therefrom, agitating the extracted juice moderately while subjecting it to a partial vacuum of at least 27 inches mercury gauge, then further subjecting the juice in a quiescent state to such partial vacuum until a substantial quantity of pulp has passed upwardly through the body of juice and collected at the surface as a layer containing impurities, rejecting at least the upper part of said layer, and packaging the residual juice, all the foregoing operations being performed at temperatures not substantially exceeding 40° F.

14. The process defined in claim ° wherein, after the stated separation of at least the upper part of said surface layer and before packaging the residual juice, said juice is agitated while still under partial vacuum until pulpy matter remaining therein is uniformly distributed therethrough.

15. In the art of preserving citrus fruit juice in its natural state, the process which comprises precooling citrus fruit to relatively low temperature while avoiding substantial freezing thereof, extracting juice from the precooled fruit, subjecting the extracted juice to the action of a vacuum until a layer of pulpy material has collected at the top, and rejecting at least the upper portion of said layer from the juice, the extraction of the juice and the succeeding stated operations being also performed at relatively low temperature.

16. In a process of preserving fruit juice in its natural state, separating contaminants from freshly extracted juice by the steps of subjecting a pulp-containing body of the juice, while it is maintained at relatively low temperature but above freezing, to the action of a partial vacuum until a considerable quantity of pulp has floated upwardly through the juice and formed a layer at the surface thereof, and then rejecting the upper portion of said layer.

17. In the art of preserving fruit juices in natural state, the process which comprises subjecting a body of freshly extracted fruit juice containing pulp particles, together with oily and other contaminants, to the action of a partial vacuum while in a relatively quiescent state until a substantial quantity of the pulp has been caused to pass upwardly through said body of juice and form a supernatant layer containing such contaminants removing at least the upper part of said layer, then agitating the residual juice while still subjecting it to the action of the partial vacuum until pulpy matter remaining therein has been uniformly distributed therethrough, and packaging the juice.

18. The process defined in claim 17 wherein all the stated operations are performed at relatively low temperature.

19. In the art of preserving fruit juices in natural state, the process which comprises subjecting a body of freshly extracted fruit juice containing pulp particles, together with oily and other contaminants, to the action of a relatively high vacuum for a limited period of time, without substantial agitation, until pulpy matter has accumulated at the surface of said body of juice in a layer carrying such contaminants, removing the upper part of said layer, then agitating the residual juice while still under relatively high vacuum, and packaging the juice.

20. The process defined in claim 19, wherein all the stated operations are performed at relatively low temperature.

21. The process defined in claim 19, wherein said limited period of time is on the order of 15 minutes and the vacuum employed is at least 27 inches gauge.

22. The process defined in claim 19 wherein said limited period of time is on the order of 15 minutes, the vacuum employed is at least 27 inches gauge, and all the stated operations are performed at relatively low temperature.

ISAAC H. POLK.